Sept. 8, 1936.  J. L. ANDERSON  2,053,890

DIRIGIBLE CUTTING OR WELDING APPARATUS

Filed July 28, 1934  3 Sheets-Sheet 1

INVENTOR
James L. Anderson
BY J. F. Brandenburg
ATTORNEY

Sept. 8, 1936.   J. L. ANDERSON   2,053,890
DIRIGIBLE CUTTING OR WELDING APPARATUS
Filed July 28, 1934   3 Sheets—Sheet 2

INVENTOR
James L. Anderson
BY J. F. Brandenburg
ATTORNEY

Sept. 8, 1936.  J. L. ANDERSON  2,053,890
DIRIGIBLE CUTTING OR WELDING APPARATUS
Filed July 28, 1934   3 Sheets-Sheet 3
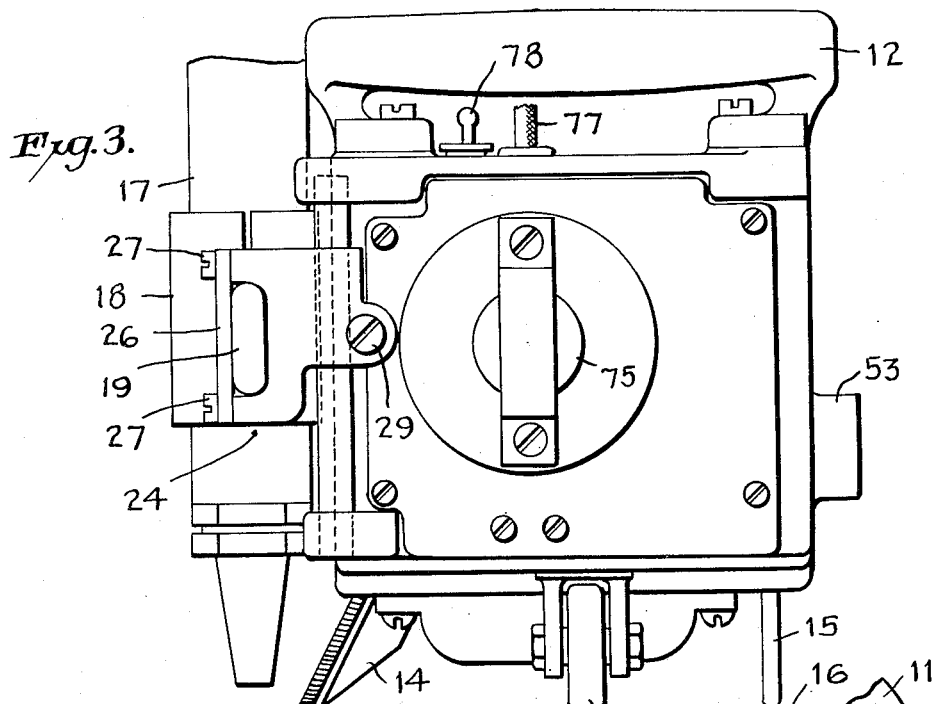
Fig. 3.
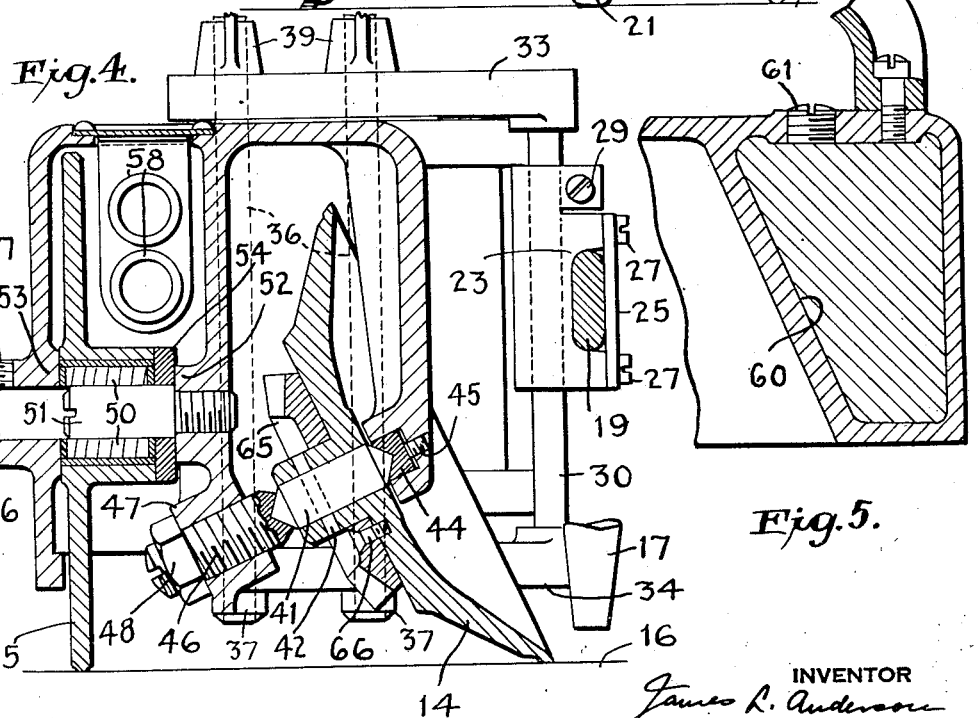
Fig. 4.
Fig. 5.
INVENTOR
James L. Anderson
BY J. F. Brandenburg
ATTORNEY Patented Sept. 8, 1936

2,053,890

UNITED STATES PATENT OFFICE 2,053,890

DIRIGIBLE CUTTING OR WELDING APPARATUS

James L. Anderson, Closter, N. J., assignor to Air Reduction Company, Incorporated, New York, N. Y., a corporation of New York Application July 28, 1934, Serial No. 737,380

11 Claims. (Cl. 266—23)

This invention relates to dirigible cutting or welding apparatus having wheels running on the surface of the work and a torch abreast of one wheel.

Such machines have a motor which rotates the driving wheel at a uniform speed and causes the torch to move across the work. Although the speed of travel of the driving wheel is accurately controlled in prior art machines of this type, the torch does not move at the same speed nor accurately follow a path similar to that of the driving wheel. Whenever the driving wheel moves along a curved path with the torch on the outside of the curve, the torch travels at higher speed than the wheel, and on very sharp curves the torch sometimes moves so fast that the cut is lost. With the torch on the inside of the curve it travels slower than the driving wheel and describes a path having a shorter radius of curvature than the path of the driving wheel, and on very sharp turns the torch describes a loop with the cut crossing itself instead of reproducing the path traveled by the driving wheel.

The invention disclosed in my Patent No. 2,001,294, dated May 14, 1935, made it possible to obtain a cut along substantially the same path as that followed by the driving wheel. This new result was obtained by a construction which brings the torch jet and the point of traction of the driving wheel so close together that the wheel runs along the edge of the kerf and the wheel and torch travel substantially the same path, and the torch moves at substantially the same speed as the driving wheel on inside as well as outside curves.

It is an object of this invention to provide an improved cutting or welding machine, of the type disclosed in my aforesaid patent, and which is more efficient and more convenient to use.

Particular objects of this invention are to stably support the forward end of the carriage at the beginning of a cut when all of the wheels are not yet on the work, and without interfering with the free guiding or steering of the carriage; to increase the tractive effort of the driving wheel by combining the elements of the machine so as to put more than a proportionate share of the total weight on the driving wheel; and to provide more convenient torch holding means for either a hand or machine type cutting torch.

Other objects, features and advantages of the invention will become apparent to those skilled in the art as the specification proceeds.

In the accompanying drawings, forming part hereof:

Fig. 3 is a view of the rearward end of the machine looking to the left in Figs. 1 and 2;

Fig. 4 is a sectional view along the line 4—4 of Fig. 2, with most of the torch broken away to show the supporting means; and Fig. 5 is a fragmentary sectional view taken on the line 5—5 of Fig. 2.

Figure 1:
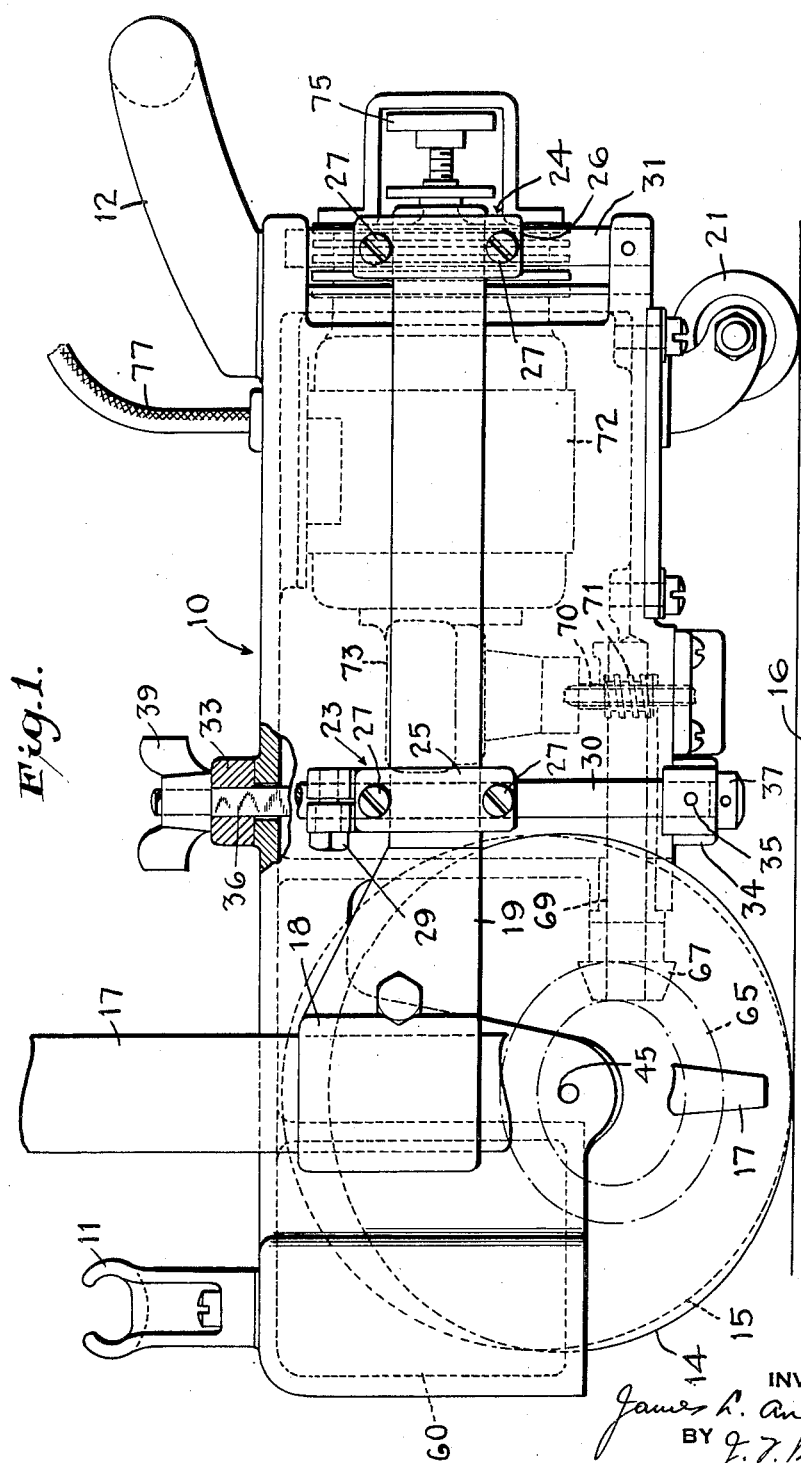
Fig. 1 is a side elevation, partly broken away, of a cutting or welding machine embodying the invention.

Fig. 1 shows a torch carriage which includes a frame or body casting 10 having handles 11 and 12 secured to its forward and rearward portions, respectively. The forward end of the carriage is supported by a driving wheel 14 and an idler wheel 15, both of which preferably turn on axes in the same vertical transverse plane so that both of these wheels contact with the work 16 along a line at right angles to the direction of travel of the carriage.

A torch 17 is clamped in a torch holder 18 at the forward end of an adapter 19. The torch is located so that its cutting or welding jet strikes the work along the line which passes through the points of contact of the wheels 14 and 15 on the work. An advantage of this relation of the wheels to each other and to the torch is that both wheels contact with the edge of the work and hold the carriage against tilting when starting a cut from the edge of the work, and similarly both wheels remain on the work until the torch completes a cut or weld extending at right angles to the edge.

The carriage has a caster wheel 21 at its rearward end. One such wheel is shown in the drawings and is sufficient, but the number of caster wheels can be increased.

The adapter 19 fits into sockets in clamps 23, 24 and is held in these sockets by plates 25, 26 which fasten to the clamps with screws 27. The clamps 23 and 24 have split ends with screws 29 for clamping the split ends at any chosen height on vertical rods 30 and 31. When the machine is to be used with a hand torch, the horizontal portion of such a torch is placed in the sockets in the clamps 23 and 24 in place of the adapter 19 which holds the machine torch 17.

The vertical rod 30 is held at its opposite ends by brackets 33 and 34. A pin 35 fastens the rod to the lower bracket 34. The upper bracket 33 clamps against the top surface of the frame or body casting 10 and the lower bracket 34 clamps against the bottom surface of this casting. Both of these brackets have slots through which rods 36 extend. There are two of these rods 36 (Fig. 2) and each one has a head 37 (Fig. 1) pinned on its lower end. The intermediate portions of the rods 36 where they pass through the brackets 33, 34 and the body casting 10 are of square section but the portion of each rod extending above the top bracket 33 is circular and threaded to receive a wing nut 39.

When the wing nuts 39 are tight, both of the brackets 33 and 34 are clamped firmly against the body casting 10. If it becomes desirable to move the torch tip so that the cutting or welding jet strikes the work closer or farther from the wheel 14, the vertical rod 30 is moved closer or farther from the side of the body casting. This rod 30 can be moved if the wing nuts 39 are loosened so that the brackets 33, 34 are free to slide. The construction of this invention with the rods 36 extending all of the way through the body casting has the advantage that the brackets 33 and 34 can both be released from the top of the machine when necessary to adjust the position of the torch.

The driving wheel 14 is dished and has a sloping axis so that its point of traction on the work is immediately adjacent the point at which the jet from torch 17 strikes the work. The torch is adjusted with respect to the driving wheel to bring the jet and the point of traction of the wheel as close together as possible without burning the wheel or causing the wheel to interfere with the cut or weld.

The position of the driving wheel 14 is best shown in Fig. 4. An axle 41 extends through the hub of the wheel 14 and is secured to the wheel by a pin 42. The ends of the axle 41 are conical. The upper end of the axle fits into a bearing block 44 which is housed in a recess in the body casting. When the block 44 is to be replaced, it can be thrust out of the recess by a screw 45 threading through the body casting. The lower end of the axle 41 runs in a conical bearing in one end of a screw 46 which threads through a boss 47 of the body casting. This screw 46 is set in position to obtain the correct bearing pressure on the conical ends of the axle 41 and the screw is then locked in position by a nut 48.

Because of their proximity to the torch jet, the axle and bearings of the wheel 14 are made of material capable of withstanding intense heat without losing their hardness or otherwise deteriorating.

The idler wheel 15 turns on roller bearings 50 on an axle 51 which has a reduced end portion threaded into a boss 52 of the body casting. The hub of the idler wheel 15 is held against axial movement by a boss 53 on one side and a thrust washer 54 on the other side. The thrust washer abuts against the boss 52.

The boss 53 extends in both directions from the body casting and has an opening 56 therethrough for receiving a radius rod. A small threaded opening 57 receives a set screw for connecting the machine to the end of the radius rod when the machine is to be used for making cuts around a fixed center.

The axle 51 is inserted through the opening 56 when assembling the machine, and can be withdrawn through this same opening if the wheel 15 is to be removed. Resistance coils 58 for the driving motor are housed in the body casting above the axle 51.

Figure 2:
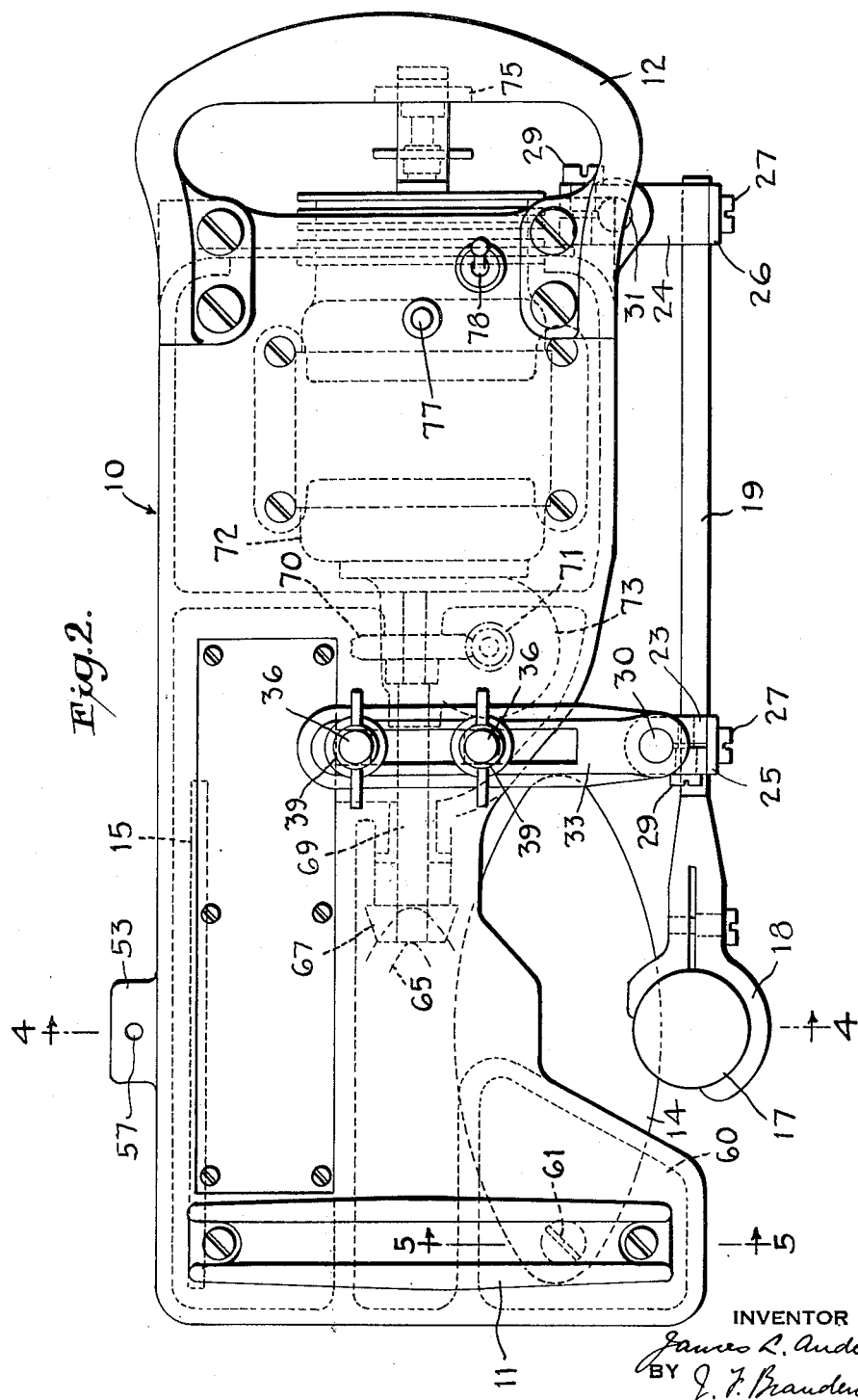
Fig. 2 is a top plan view of the machine shown in Fig. 1.

In the forward end of the body casting, on the driving wheel side of the casting, there is a chamber 60 (Figs. 1, 2 and 5). This chamber is filled with lead (Fig. 5) which is poured into the chamber through an opening in its top wall. The opening is closed by a plug 61. The weight of the lead increases the weight on the driving wheel 14 and shifts the center of gravity of the machine toward the driving wheel side, thereby increasing the tractive effort of the driving wheel. Instead of lead ballast, the portion of the casting enclosing the lead chamber in the drawing may be made solid when the casting is originally poured. The lead weight is heavier, but the solid casting more economical.

The driving wheel 14 has a ribbed periphery, as shown in Fig. 3, to increase its friction and make it less liable to slip on the surface of the work. The driving wheel face which contacts with the work is narrow. This increases the pressure of the wheel on the work and makes the machine turn more easily.

A bevel gear 65 is fastened to the driving wheel 14 by screws 66 (Fig. 4), and meshes with another bevel gear 67 (Figs. 1 and 2) on a drive shaft 69. The drive shaft 69 is supported by suitable bearings in the body casting and has a worm wheel 70 secured to it near one end. The worm wheel 70 is rotated by a worm 71 which is driven from a motor 72 through reduction gearing 73.

The motor 72 is of the governor controlled type and has a knob 75 located close to the handle 12 so that an operator can turn the knob 75 with the fingers of the hand grasping the handle 12 and without letting go of the handle 12.

Power for the motor is supplied through a conductor 77 and controlled by a snap switch. The switch handle 78 is located close to the handle 12 for operation by the same hand which grips the handle 12 without letting go of the handle.

The operation of the machine is as follows.

A path for a cut or weld is laid out on the surface of the work and the machine is brought to the edge of the work. The wheels 14 and 15 are placed on the surface immediately adjacent the edge so that the torch jet strikes the work at the edge. As soon as the preliminary heating has progressed sufficiently, the operator moves the switch handle 78 to close the circuit to the motor and the driving wheel 14 propels the machine across the surface of the work.

When initially placing the carriage on the work, the driving wheel is placed alongside of the path to be cut or welded and the carriage is guided by an operator holding the handle 12, or 11, or both, to cause the driving wheel to follow along the edge of the path. The close proximity of the torch jet and point of traction of the driving wheel causes the jet and wheel to follow almost identical paths regardless of curves and reverses in curvature. The wheel 15 being free to turn at any speed or in either direction can slow down, stop, or even turn backward, as may be necessary when turning sharp curves with the machine turning on the point of traction of the driving wheel 14 as a center.

When the carriage approaches the edge of the work along a path normal to the edge, the wheels 14 and 15 stably support the machine until the torch reaches the edge. A path sloping in one direction with respect to the edge causes the driving wheel and torch to reach the edge ahead of the wheel 15 and the machine is stably supported to the end of the cut. If the path to be cut requires the machine to approach the edge of the work from such an angle that the wheel 15 reaches the edge before the cut is completed, then the operator holds the machine against tipping, the forward handle 11 being especially convenient for holding the forward end of the carriage upright.

The preferred embodiment of the invention has been illustrated and described but modifications can be made and some features of the invention can be used alone without departing from the invention as defined in the claims.

I claim:

1. A free wheel torch carriage comprising a unitary frame stably supported by several wheels including two transversely spaced wheels having their axes in the same plane transverse of their planes of rotation and a torch holder on the carriage in position to support a cutting or welding torch outside of said wheels and with its tip directed to strike the work immediately adjacent the point at which one of the wheels contacts with the work and along a line which passes through the points of contact of said transversely spaced wheels with the work.

2. A torch carriage comprising a frame, a torch holder connecting with the frame for supporting a cutting or welding torch, two wheels supporting the frame in the region of the tip of said torch, one of said wheels sloping toward the torch tip and contacting with the work adjacent the point at which the jet from said tip strikes the work.

3. Cutting or welding apparatus comprising a torch carriage for traveling on the surface of the work, a torch holder connected with the carriage in position to support a torch with its tip near one end portion of the carriage, two wheels supporting that end portion of the carriage including a driving wheel close to the torch and dished to bring its point of contact with the work close to the cutting or welding jet.

4. Cutting or welding apparatus comprising a torch carriage, a torch supported by the carriage in position to operate on said work, several wheels for stably supporting the carriage including a driving wheel and an idler wheel, both of which contact with the work along a line through the point where the jet from said torch strikes the work, the driving wheel being constructed and arranged to contact with the work immediately adjacent the point where the jet strikes the work.

5. Cutting or welding apparatus comprising a torch carriage for traveling on the surface of the work, a torch holder on the carriage for supporting a torch in position to operate on said work, said carriage including a driving wheel which contacts with the work immediately adjacent the point at which the torch jet strikes the work, and one or more idler wheels in position to cooperate with the driving wheel to stably support the carriage against tipping sideways when the torch is operating on the edge of the work at the beginning and end of a cut or weld.

6. A carriage comprising a frame, a torch holder connected with the frame for supporting a cutting or welding torch in operative relation with the work on which the carriage is supported, wheels on the carriage for moving it across the work, said wheels including at least two wheels supporting the same end of the frame and transversely spaced to prevent tipping of the frame, the one of said transversely spaced wheels nearest the torch sloping outward toward its bottom edge, and driving mechanism connected to the sloping wheel.

7. A torch support including three wheels for running on the surface of the work, two of said wheels being at the front end of the support and the other of said wheels at the rearward end, caster bearings for the wheel at the rearward end of the support, and means on the support for holding a torch in position to direct a jet against the work immediately adjacent the point of contact of one of the front wheels on the work.

8. A torch carriage comprising a frame, means for holding a cutting or welding torch with its tip adjacent the front portion of the frame, wheels stably supporting the frame on the surface of the work, the front end of the frame being supported by at least two wheels, one of which is driven and contacts with the work immediately adjacent the point at which the jet from the torch strikes the work, motor means for operating the driven wheel, the weight of the carriage being distributed so as to throw more than a proportionate amount on the driven wheel to increase its tractive effort.

9. A cutting or welding machine including a wheeled supporting frame, a bracket connected with the upper part of the supporting frame, and a separate bracket connected with the lower part of said supporting frame, both of said brackets extending from one side of supporting frame, a torch holder carried by both of the brackets, and common means for holding the brackets against movement relative to the frame, said means being releasable so that the brackets can be moved to change the position of the torch with respect to the frame.

10. Cutting or welding apparatus including a movable support, two torch holders on said support comprising spaced clamps constructed and arranged to hold a hand cutting or welding torch, an adapter held in said clamps, and another clamp adjacent one end of the adapter for holding a machine type of cutting or welding torch.

11. The combination with a carriage having wheels for supporting it on the surface of the work and clamps at spaced points on the carriage constructed and arranged to hold a hand torch in position to direct a jet against the work close to the point of contact of one of said wheels with the work, of an adapter, held by the spaced clamps on the carriage, and having a torch holder near one end in position to hold a machine-type torch disposed in position to direct a jet against the work at substantially the same point as said hand torch.

JAMES L. ANDERSON.